(12) United States Patent
Rouse et al.

(10) Patent No.: US 12,450,857 B2
(45) Date of Patent: Oct. 21, 2025

(54) AUTOMATIC METHOD TO FIND EXTENT OF REPEATING GEOMETRY IN AN INTEGRATED CIRCUIT LAYOUT

(71) Applicant: KLA Corporation, Milpitas, CA (US)

(72) Inventors: Gordon Rouse, Dublin, CA (US); Srivathsan Krishnamohan, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/797,300

(22) Filed: Aug. 7, 2024

(65) Prior Publication Data

US 2025/0095317 A1    Mar. 20, 2025

Related U.S. Application Data

(60) Provisional application No. 63/539,103, filed on Sep. 19, 2023.

(51) Int. Cl.
*G06V 10/22* (2022.01)
*G06T 7/00* (2017.01)

(52) U.S. Cl.
CPC ............ *G06V 10/22* (2022.01); *G06T 7/0004* (2013.01); *G06T 2207/30148* (2013.01)

(58) Field of Classification Search
CPC ............................... G06V 10/22; G06T 7/0004
See application file for complete search history.

(56) References Cited

U.S. PATENT DOCUMENTS

| | | |
|---|---|---|
| 7,570,796 B2 | 8/2009 | Zafar et al. |
| 7,676,077 B2 | 3/2010 | Kulkarni et al. |
| 8,126,255 B2 | 2/2012 | Bhaskar et al. |
| 8,664,594 B1 | 3/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |
| 2018/0165803 A1 | 6/2018 | Cheng et al. |

(Continued)

FOREIGN PATENT DOCUMENTS

WO    2016-040463    3/2016

OTHER PUBLICATIONS

International Search Report and Written Opinion for PCT/US2024/045224 mailed Dec. 23, 2024.

*Primary Examiner* — Sam Bhattacharya
(74) *Attorney, Agent, or Firm* — Entropy Matters LLC

(57) ABSTRACT

Methods and systems for determining information for an area having unknown patterns and unknown pattern repeatability are provided. One or more computer systems of the system are configured for detecting first and second polygons in first and second rows, respectively, in a design for a specimen. The first and second rows have first dimensions perpendicular to an edge of a known area in the design from inner boundaries of the rows to outer boundaries of the rows. The computer system(s) are also configured for determining first and second repeating pitches of the first and second polygons, respectively. When the first and second repeating pitches are different from each other, the computer system(s) are configured for determining an outer boundary of the area having the unknown patterns and the unknown pattern repeatability as the outer boundary of the first row.

23 Claims, 4 Drawing Sheets

(56) References Cited

U.S. PATENT DOCUMENTS

| | | |
|---|---|---|
| 2019/0033211 A1 | 1/2019 | Neil et al. |
| 2020/0324485 A1 | 10/2020 | Zeulner et al. |
| 2023/0005117 A1 | 1/2023 | Barnwal et al. |
| 2023/0005286 A1* | 1/2023 | Yebes Torres ..... G06Q 30/0283 |

* cited by examiner

AUTOMATIC METHOD TO FIND EXTENT OF REPEATING GEOMETRY IN AN INTEGRATED CIRCUIT LAYOUT

BACKGROUND OF THE INVENTION

1. Field of the Invention

The present invention generally relates to methods and systems for determining information for an area having unknown patterns and unknown pattern repeatability. Certain embodiments relate to automatic methods for finding the extent of repeating geometry in an integrated circuit layout.

2. Description of the Related Art

The following description and examples are not admitted to be prior art by virtue of their inclusion in this section.

Inspection processes are used at various steps during a semiconductor manufacturing process to detect defects on reticles and wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

"Care areas" as they are commonly referred to in the art are areas on a specimen that are of interest for inspection purposes. Sometimes, care areas are used to differentiate between areas on the specimen that are inspected from areas on the specimen that are not inspected in an inspection process. In addition, care areas are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from care area to care area in a similar manner.

While the concept of care areas is relatively straightforward, setting them up has become increasingly challenging with advances in semiconductor designs in addition to other possible road blocks for care area setup. One simple, but difficult to workaround, problem is that suitable design information for a specimen may not be available to the system, method, or user that is setting up an inspection process. Therefore, what structures are formed on the specimen and how they can be inspected may have to be determined entirely from inspection system images, which usually do not generate images in which the specimen structures are resolved and can be accurately identified, and/or from limited design information that may not contain all of the information that is needed for suitable inspection recipe setup. One of the more complex problems is the effects that different design features can have on the inspection system images. For example, different design structures can produce different levels of noise in inspection system images of a specimen, which ideally the inspection recipe would be designed to adapt to in order to accurately detect defects with the highest possible sensitivity in spite of the noise.

One way to deal with noise in inspection images and its effects on defect detection is to use array mode inspection in any instance in which it can be used. For example, array mode inspection takes advantage of the repeating nature of memory array structures by comparing images of different (and often adjacent) repeating structures in the memory array (often called "cells") and then detecting defects based on the resulting difference images. Due to the fact that the repeating structures in the memory array that can be used to generate difference images are formed so close together on the specimen, the repeating structure images should have substantially similar noise that will cancel out by subtraction of the images. The resulting difference images should therefore be quieter (less noisy) and can be inspected with a higher sensitivity (e.g., a lower threshold) than more noisy difference images such as those generated by subtracting images from different dies on the specimen.

While memory areas can be assumed to contain repeating structures and can be found relatively easily (even when the inspection images contain little pattern information and when the design data available for inspection setup is relatively limited), finding repeating structures in other areas formed on a specimen can be much more difficult. In particular, determining if there are repeating structure geometries in logic areas on a specimen is much more difficult than finding array areas on the specimen. Due to the complexities of this process, finding logic repeating structures that can be inspected in array mode is often done manually by a user and only in instances in which the design data is available for inspection setup. For example, currently, a user may pre-process the integrated circuit (IC) layout to draw a bounding box around the repeating geometry. Once a bounding box has been created, design hierarchy can be used to determine areas for array mode inspection.

There are, therefore, a number of obvious disadvantages to such array mode care area setup. For example, the currently used methods require the users to have prior knowledge of the IC layout and the layout needs to be captured using hierarchical blocks. Inspection tool users usually do not have that much information for the IC design. The layout used for inspection setup usually has the design hierarchy obfuscated. Hence, an automated technique for determining repeating geometry and their extent is needed.

Accordingly, it would be advantageous to develop systems and methods for determining information for an area having unknown patterns and unknown pattern repeatability that do not have one or more of the disadvantages described above.

SUMMARY OF THE INVENTION

The following description of various embodiments is not to be construed in any way as limiting the subject matter of the appended claims.

One embodiment relates to a system configured for determining information for an area having unknown patterns and unknown pattern repeatability. The system includes one or more computer systems configured for detecting first and second polygons in first and second rows, respectively, in a design for a specimen. The first row has a first dimension extending in a first direction perpendicular to an edge of a known area in the design from an inner boundary to an outer boundary of the first row. The second row has a first dimension extending in the first direction from the outer boundary of the first row to an outer boundary of the second row. The computer system(s) are also configured for determining first and second repeating pitches of the first and second polygons, respectively. When the first and second repeating pitches are different from each other, the computer system(s) are configured for determining an outer boundary of the area having the unknown patterns and the unknown pattern repeatability as the outer boundary of the first row. The system may be further configured as described herein.

Another embodiment relates to a computer-implemented method for determining information for an area having unknown patterns and unknown pattern repeatability. The method includes the detecting, determining first and second repeating pitches, and determining an outer boundary steps described above. The steps of the method are performed by one or more computer systems. The steps of the method may be further performed as described herein. The method may include any other step(s) of any other method(s) described herein. The method may be performed by any of the systems described herein.

An additional embodiment relates to a non-transitory computer-readable medium storing program instructions executable on a computer system for performing a computer-implemented method for determining information for an area having unknown patterns and unknown pattern repeatability. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
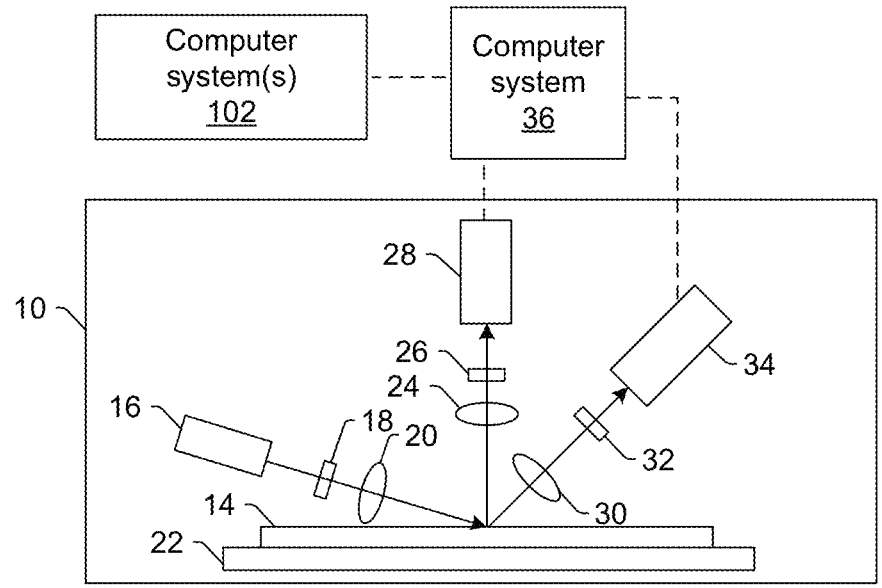
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for determining information for an area having unknown patterns and unknown pattern repeatability. The embodiments described herein can be advantageously used to automatically find the extent of repeating geometry in an integrated circuit (IC) layout. As described further herein, by determining the extent of the repeating geometry in an IC layout, a process performed on specimens having such geometry formed thereon can be improved. For example, the sensitivity of an inspection process can be increased for areas in which the repeating geometry is found, which is advantageous for a number of reasons described further herein. Currently, finding the extent of repeating geometry in areas such as logic areas suffers from a number of disadvantages such as requiring significant manual effort, which decreases the accuracy of such methods and increases the time involved. The embodiments described herein overcome such disadvantages with new methods for automatically and accurately finding the repeating geometry extent.

In optical (and possibly other) inspection systems, two primary modes of defect detection are used: (1) array, which works by comparing repeating geometry (cells) present in the same die; and (2) random, which compares the same areas from different dies. Array mode advantageously reduces noise and can lead to uncovering defects not caught by random inspection. Presently, array mode inspection is mostly done on memory and relatively small logic regions.

To do array mode inspection, array care areas or outlines identifying the repeating cells need to be created. In the case of memory structures, outline layers around them help in creating array care areas. However, in the case of logic regions, outlines identifying repeating patterns are not available. Current approaches for creating array care areas requires users to know the location of repeating structures in the design. A user draws outlines around repeating structures that are then used by the method or system to identify repeating cells within the outline. Most of the designs used for inspection are processed for mask preparation and hence design information is obfuscated. The only information available is usually polygon structures and memory outlines. Therefore, a need exists for a generic way to find repeating patterns in logic areas without relying on an outline layer or design hierarchy information. The embodiments described herein provide a novel technique to determine repeating areas in logic regions.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of such a system is shown in FIG. 1. The system includes a computer system, e.g., computer system 36 and/or one or more computer systems 102. In some embodiments, the system includes imaging subsystem 10, which may be configured as one of the types of imaging subsystems described herein such as an inspection, metrology, or defect review subsystem, which may include and/or be coupled to computer system 36 and/or one or more computer systems 102.

The terms "imaging system" and "imaging subsystem" are used interchangeably herein and generally refer to the hardware configured for generating images of a specimen. In general, the imaging subsystems described herein include at least an energy source and a detector. The energy source is configured to generate energy that is directed to a specimen. The detector is configured to detect energy from the specimen and to generate output responsive to the detected energy.

In a light-based imaging subsystem, the energy directed to the specimen includes light, and the energy detected from the specimen includes light. For example, as shown in FIG. 1, the imaging subsystem includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen, the characteristics of the specimen to be measured, etc.

The illumination subsystem may be configured to direct the light to the specimen at different angles of incidence. For example, the imaging subsystem may be configured to alter one or more parameters of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence. The illumination subsystem may have any other suitable configuration known in the art for directing the light to the specimen at one or more angles of incidence sequentially or simultaneously.

The illumination subsystem may also be configured to direct light with different characteristics to the specimen. For example, optical element 18 may be configured as a spectral filter and the properties of the spectral filter can be changed in a variety of different ways (e.g., by swapping out one spectral filter with another) such that different wavelengths of light can be directed to the specimen at different times.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. The light may be scanned over the specimen in any suitable fashion such as in a serpentine-like path or in a spiral path.

The imaging subsystem includes one or more detection channels. At least one of the detection channel(s) includes a detector configured to detect light from the specimen due to illumination of the specimen by the system and to generate output responsive to the detected light. The imaging subsystem shown in FIG. 1 includes two detection channels, one formed by collector 24, element 26, and detector 28 and another formed by collector 30, element 32, and detector 34. The two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

In FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). The detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels is configured to collect light at different scattering angles than each of the other collectors.

As described further above, one or more of the detection channels may be configured to detect scattered light. Therefore, the imaging subsystem shown in FIG. 1 may be configured for dark field (DF) imaging. However, the imaging subsystem may also or alternatively include detection channel(s) that are configured for bright field (BF) imaging. Therefore, the imaging subsystems described herein may be configured for only DF, only BF, or both DF and BF imaging. Although each of the collectors are shown in FIG. 1 as single refractive optical elements, each of the collectors may include refractive optical element(s) and/or reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors in each of the detection channels may be signals or data, but not image signals or image data. In such instances, a computer system may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

Computer system 36 may be coupled to the detectors of the imaging subsystem in any suitable manner (e.g., via one or more transmission media, which may include "wired" and/or "wireless" transmission media) such that the computer system can receive the output generated by the detectors. Computer system 36 may be configured to perform a number of functions using the output of the detectors as described further herein. Computer system 36 may be further configured as described herein.

Computer system 36 (as well as other computer systems described herein) may also be referred to herein as computer subsystem(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer system, then the different computer systems may be coupled to each other such that images, data, information, instructions, etc. can be sent between the computer systems. For example, computer system 36 may be coupled to computer system(s) 102 as shown by the dashed line in FIG. 1 by any suitable transmission media, which may include any suitable wired and/or wireless transmission media known in the art. Two or more of such computer systems may also be effectively coupled by a shared computer-readable storage medium (not shown).

In an electron beam imaging subsystem, the energy directed to the specimen includes electrons, and the energy detected from the specimen includes electrons. In one such embodiment shown in FIG. 2, the imaging subsystem includes electron column 122, and the system includes computer system 124 coupled to the imaging subsystem. Computer system 124 may be configured as described above. In addition, such an imaging subsystem may be coupled to another one or more computer systems in the same manner described above and shown in FIG. 1.

Figure 2:
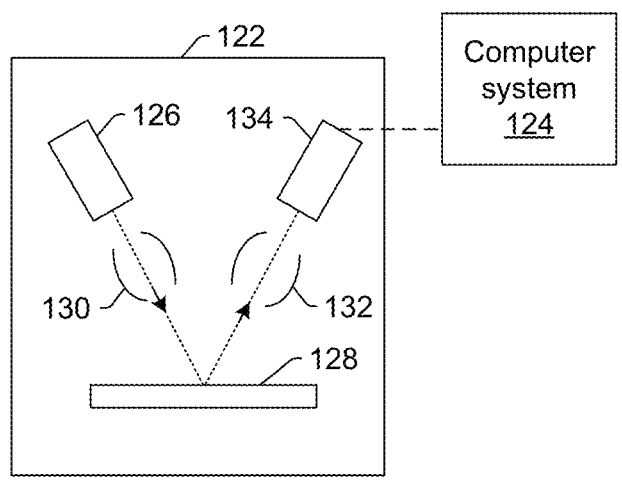

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer system 124 may be coupled to detector 134 as described above. The detector may detect electrons returned from the surface of the specimen thereby forming electron beam images of (or other output for) the specimen. The electron beam images may include any suitable electron beam images. Computer system 124 may be configured to perform any step(s) described herein. A system that includes the imaging subsystem shown in FIG. 2 may be further configured as described herein.

FIGS. 1 and 2 are provided herein to generally illustrate configurations of an imaging subsystem that may be included in the system embodiments described herein. Obviously, the imaging subsystem configurations described herein may be altered to optimize the performance of the imaging subsystem as is normally performed when designing a commercial imaging system. In addition, the systems described herein may be implemented using an existing imaging subsystem (e.g., by adding functionality described herein to an existing inspection system) such as the tools that are commercially available from KLA Corp., Milpitas, Calif. For some such systems, the methods described herein may be provided as optional functionality of the imaging subsystem (e.g., in addition to other functionality of the imaging system). Alternatively, the imaging system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 2 except that the electron beam source may be replaced with any suitable ion beam source known in the art. In addition, the imaging subsystem may include any other suitable ion beam system such as those included in commercially available focused ion beam (FIB) systems, helium ion microscopy (HIM) systems, and secondary ion mass spectroscopy (SIMS) systems.

The imaging subsystem may be configured to generate output, e.g., images, of the specimen with multiple modes. In general, a "mode" is defined by the values of parameters of the imaging subsystem used for generating images of a specimen (or the output used to generate images of the specimen). Therefore, modes may be different in the values for at least one of the parameters of the imaging subsystem (other than position on the specimen at which the output is generated). For example, the modes may be different in any one or more alterable parameters (e.g., illumination polarization(s), angle(s), wavelength(s), etc., detection polarization(s), angle(s), wavelength(s), etc.) of the imaging subsystem. The imaging subsystem may be configured to scan the specimen with the different modes in the same scan or different scans, e.g., depending on the capability of using multiple modes to scan the specimen at the same time.

In a similar manner, the electron beam subsystem may be configured to generate images with two or more modes, which can be defined by the values of parameters of the electron beam subsystem used for generating images for a specimen. Therefore, modes may be different in the values for at least one of the electron beam parameters of the electron beam subsystem. For example, different modes may use different angles of incidence for illumination.

The imaging subsystems described herein may be configured as an inspection system, a metrology system, and/or a defect review system. For example, the embodiments of the imaging subsystem shown in FIGS. 1 and 2 may be modified in one or more parameters to provide different imaging capability depending on the application for which it will be used. In one such example, the imaging subsystem may be configured to have a higher resolution if it is to be used for metrology rather than for inspection. In other words, the embodiments of the imaging subsystem shown in FIGS. 1 and 2 describe some general and various configurations for an imaging subsystem that can be tailored in a number of manners that will be obvious to one skilled in the art to produce systems having different imaging capabilities that are more or less suitable for different applications.

In this manner, the imaging subsystem may be configured for generating output that is suitable for detecting or re-detecting defects on the specimen in the case of an inspection system or a defect review system, respectively, and for measuring one or more characteristics of the specimen in the case of a metrology system. In an inspection system, computer system 36 shown in FIG. 1 may be configured for detecting defects on specimen 14 by applying a defect detection method or algorithm to output generated by one or more of the detectors. In a defect review system, computer system 124 shown in FIG. 2 may be configured for re-detecting defects on specimen 128 by applying a defect re-detection method to the output generated by detector 134 and possibly determining additional information for the re-detected defects using the output generated by the detector. In a metrology system, computer system 36 shown in FIG. 1 may be configured for determining one or more characteristics of specimen 14 using the output generated by detectors 28 and/or 34. The system may be further configured for detecting or re-detecting defects on the specimen, determining characteristics of the specimen, determining other information for the specimen, etc. as described further herein.

As noted above, the imaging subsystem is configured for scanning energy (e.g., light, electrons, etc.) over a physical version of the specimen thereby generating output for the physical version of the specimen. In this manner, the imaging subsystem may be configured as an "actual" subsystem, rather than a "virtual" subsystem. However, a storage medium (not shown) and computer system(s) 102 shown in FIG. 1 may be configured as a "virtual" system. In particular, the storage medium and the computer system(s) may be configured as a "virtual" imaging system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., which are incorporated by reference as if fully set forth herein. The embodiments described herein may be further configured as described in these patents.

The terms "first" and "second" are used herein only to differentiate between different things, e.g., different rows, different polygons, etc. These terms are not meant to indicate any other preferential, spatial, temporal, or other characteristics of the elements. In addition, although some embodiments may be described with respect to first and second elements, like first and second polygons, the embodiments are not limited to only two of any one element. For example, although some embodiments may be described with respect to first and second rows, they may also be performed with a third row and so on.

The system includes one or more computer systems, which may include any of the computer systems described further herein, configured for detecting first and second polygons in first and second rows, respectively, in a design for a specimen. Detecting the polygons may include extracting polygons from the design that intersect the area covered by the current row, row by row, e.g., using pattern search as described further herein. In one embodiment, the design for the specimen is an image of the specimen generated by an imaging subsystem as described herein. However, in another embodiment, the design for the specimen is a design image of the specimen generated from design data for the specimen, which may include any of the design data described herein. In a further embodiment, the design for the specimen includes a vectorized representation of design shapes in design data for the specimen, which may include any of the design data described herein. The computer system(s) may acquire any of such designs for the specimen by generating the image, e.g., using an imaging subsystem described herein, or from design data for the specimen. The computer system(s) may alternatively acquire the design for the specimen from a storage medium in which the design has been stored, e.g., by the imaging subsystem, by another system or method, etc.

In this manner, the rows may be defined in different kinds of information for the design for the specimen, whether that is a design image, a vectorized representation of design shapes, or a specimen image. In any of these cases, the detecting step may be performed using rows of polygons, and the polygons may be described by coordinates. In one such example, when the detecting step may include pattern search using a vectorized image of the design, where each shape is described as a series of coordinates.

The polygons detected in the first and second row may or may not be the same kinds of polygons. For example, detecting the first and second polygons in the first and second rows, respectively, means that, in the embodiments described herein, detecting the first and second polygons are performed separately and independently. In addition, the detecting step may be performed to detect if any polygons are present in the rows regardless of what kinds of polygons they are. Although the characteristics and kinds of polygons that are in the rows may be of interest for other reasons, e.g., inspection recipe setup, for the purpose of determining the extent of the repeating logic areas, that information is irrelevant and as described further herein, the repeating pitch of the polygons in the rows is the useful information.

The term "known area" as used herein is defined as an area in the design in which the patterned features, repeating or otherwise, are known or are otherwise not of interest. For example, the known area may be a memory array area as described further herein but other known area types are also possible. The term "area having unknown patterns and unknown pattern repeatability" is used interchangeably herein with the term "unknown area" and is used to refer to an area in the design whose patterned features and their repeatability (or lack thereof) are unknown and are of interest. As described further herein, the unknown area may be a logic area in the design whose patterned features and their repeatability are of interest although other types of unknown areas are also possible.

In one embodiment, the known area includes a memory array area. In another embodiment, the first and second polygons include repeating logic structures. For example, the goal of the embodiments described herein may be to determine the extent of repeating geometry around memory array structures. Although the embodiments were created for and are described herein with respect to determining the extent of repeating logic structures, the embodiments may be used to determine the presence and/or extent of repeating patterned structures in other areas in the design. In particular, memory array areas may be easily identified in images or design data that is available to inspection tool users, and so the embodiments described herein may not be needed to identify memory array areas for inspection purposes. However, if the memory array areas are not obvious or are unknown, the embodiments described herein could also be used to find the memory array areas and the extent of the repeating patterns in the memory array areas. In addition, the embodiments described herein can be used to identify the extent of repeating patterns for any other area in any design for any of the specimens described herein.

Figure 3:
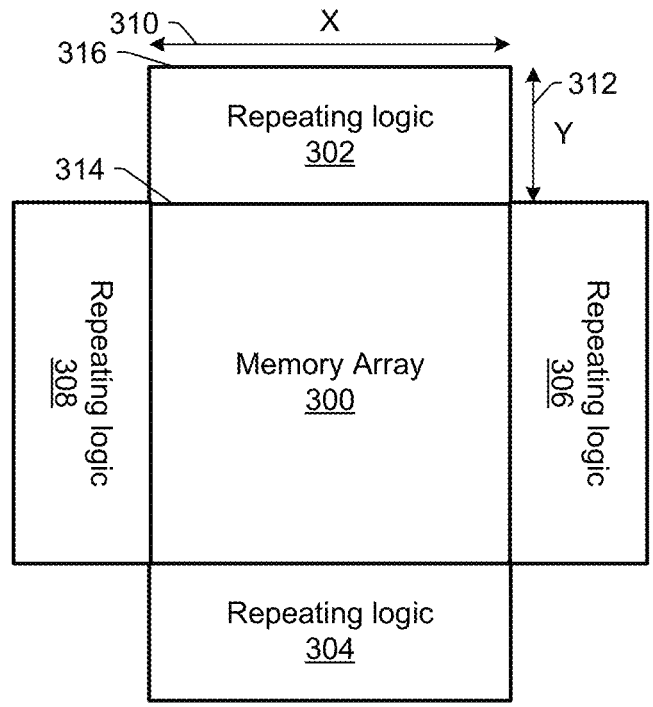
FIG. 3 is a schematic diagram illustrating a plan view of one example of a memory area and repeating logic regions that may be formed on a specimen.

FIG. 3 illustrates one example of a memory array area surrounded by logic with repeating patterns. In particular, memory array area 300 is surrounded by different repeating logic areas 302, 304, 306, and 308, one formed adjacent to each of the outer edges of the memory array area. Each of the repeating logic areas has dimensions in the X and Y directions. For example, repeating logic area 302 has dimension 310 in the X direction and dimension 312 in the Y direction. As shown in FIG. 3, the dimensions of repeating logic areas 302 and 304 in the X direction may be the same as a dimension of the memory array area, and the dimensions of these repeating logic areas in the Y direction may be unknown but determined by the embodiments described herein. In contrast, the dimensions of repeating logic areas 306 and 308 in the Y direction may be the same as a dimension of the memory array area, and the dimensions of these repeating logic areas in the X direction may be unknown but determined by the embodiments described herein. In other words, the goal of the embodiments described herein is to determine the X and Y dimensions of the repeating logic areas. The dimension of the repeating logic areas that is parallel to the memory array edge can be safely assumed to be the same size as the array edge. The embodiments may determine the X dimension for repeating logic areas 306 and 308 on the right and left sides of the memory array area and/or the Y dimension for repeating logic areas 302 and 304 on the top and bottom of the memory array area.

The first row has a first dimension extending in a first direction perpendicular to an edge of a known area in the design from an inner boundary to an outer boundary of the first row. In other words, the inner boundary of the first row may be defined as the edge of the known area, which can be identified as described further herein. In one such embodiment shown in FIG. 4, known area 400 may be a memory array area or other area in which the patterned features are known or are not of interest. First row 402 has first dimension 408 in a first direction perpendicular to edge 414 of the known area from an inner boundary (in this case also edge 414 of the known area) to outer boundary 416 of the first row. As such, the steps described herein may be started from the edge of the known area with the first row.

Figure 4:
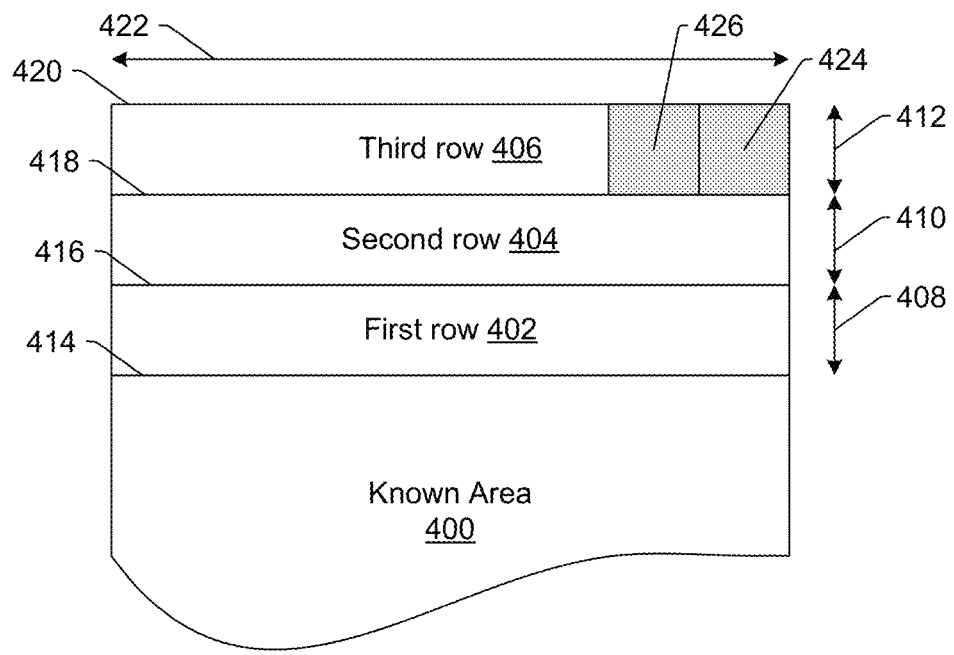
FIG. 4 is a schematic diagram illustrating a plan view of an embodiment of a known area in a design for a specimen and first, second, and third rows with source areas shown in one of the rows that may be used as described herein to determine information for an area having unknown patterns and unknown pattern repeatability.

The second row has a first dimension extending in the first direction from the outer boundary of the first row to an outer boundary of the second row. In other words, the outer boundary of the first row may be the same as the inner boundary of the second row. As shown in FIG. 4, for example, second row 404 has first dimension 410 extending in a first direction perpendicular to edge 414 of the known area from inner boundary 416 of the second row to outer boundary 418 of the second row. As such, the inner boundary of the second row is also the same as the outer boundary of the first row. In this manner, the steps described herein can be performed starting at the edge of the known area and proceeding row by row, which are adjacent to each other, for at least two rows.

In some embodiments, the system includes an imaging subsystem configured for generating an image of the specimen, which may be configured according to any of the embodiments described herein, the first dimension of the first and second rows is equal to one pixel in the image, and the computer system(s) are configured for selecting a pixel size for generating the image equal to a smallest pixel size of the imaging subsystem. For example, the first and second rows may have a height of one pixel and width=X units. The smallest pixel size, e.g., 30 nm or whatever the smallest pixel size of the imaging system is, may be used as the height.

In one embodiment, the first and second rows have a second dimension extending in a second direction parallel to the edge of the known area equal to a length of the edge of the known area. For example, as shown in FIG. 4, first and second rows 402 and 404, respectively, have second dimension 422 extending in a second direction parallel to edge 414 of known area 400 equal to a length of the edge of the known area. The second dimension of the rows may be so defined for practical purposes. However, the second dimension of the rows may be defined based on common design practices such as usually having the repeating (or other) logic areas being as wide (or as long as) the edge of the memory array area that they are next to. The second dimension of the rows does not necessarily have to be equal to a length of the edge of the side of the known area on which they are located. In addition, the second dimension may in some instances be initially larger (or smaller) than necessary and then adjusted based on results of one or more of the steps described herein, e.g., the results of detecting the polygons.

Figure 5:
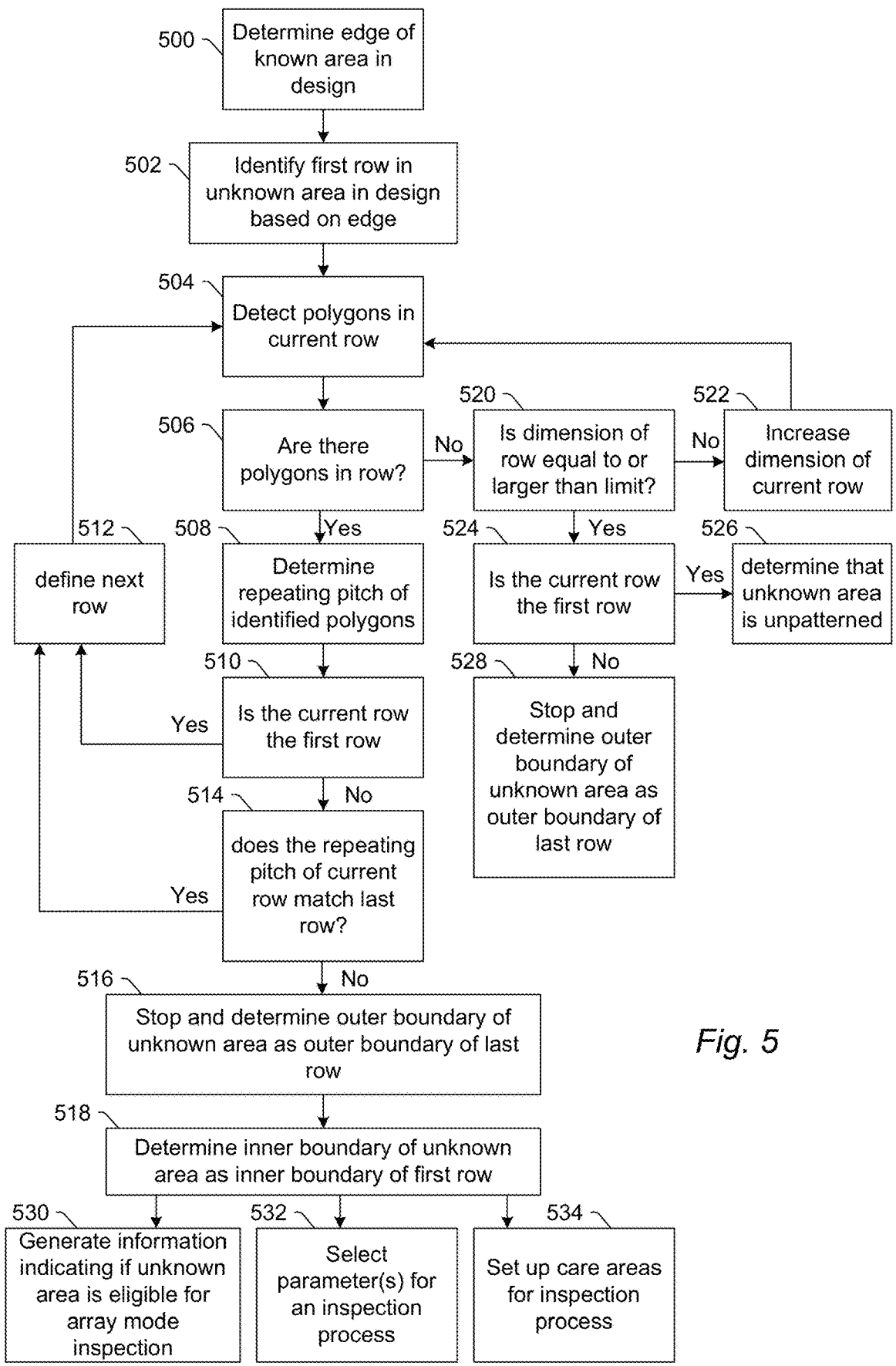
FIG. 5 is a flow chart illustrating an embodiment of determining information for an area having unknown patterns and unknown pattern repeatability.

In a further embodiment, as shown in step 500 of FIG. 5, the one or more computer systems are configured for determining the edge of the known area in the design based on an array outline layer in the design for the specimen. For example, in the case of repeating logic 302 on top of memory array 300 shown in FIG. 3, to determine Y, the computer system(s) may determine and then start from the top edge of the memory array. The top edge of the memory array may be determined using an array outline layer present in a design for the specimen. In another example, in the case of known area 400 shown in FIG. 4, the computer system(s) may determine edge 414 of the known area in the design based on an array outline layer in the design for the specimen. Unlike memory array areas, which are clearly marked using an outline layer, in logic regions, there are no outlines identifying the presence of repeating patterns. Once the edge of the known area in the design is identified, the computer system(s) may identify pixels in the first row in the unknown area in the design based on the edge, as shown in step 502 of FIG. 5. The first row of pixels may be identified in the design as described further herein.

In another embodiment, the detecting first and second polygons, determining the first and second repeating pitches, and determining the outer boundary of the known area steps described herein are performed without hierarchical blocks in the design for the specimen. For example, the embodiments described herein can advantageously automatically identify the extent of repeating geometry without an IC layout that is made up of hierarchical blocks. In particular, one new feature of the embodiments described herein is that they can identify the extent of repeating geometry using pattern search without relying on design hierarchy.

In some embodiments, the detecting the first and second polygons, determining the first and second repeating pitches, and determining the outer boundary of the unknown area steps described herein are separately performed for an additional edge of the known area. For example, although embodiments are described herein with respect to determining Y dimension 312 of repeating logic area 302 on top of memory array area 300 shown in FIG. 3, the embodiments may perform the same steps for any of the other areas formed adjacent to any of the other edges of the memory array area. The steps described herein may be repeated for multiple edges of the known area when it is not known or obvious that the repeating logic areas on two or more sides of the memory array area have the same configurations and/or dimensions.

In one embodiment, detecting the first and second polygons is performed with pattern search that includes searching for unknown patterns of interest (POIs). For example, in the embodiments described herein, the POI will most likely not be known. Instead, one new feature of the embodiments described herein is that the computer system(s) may automatically determine the POI used to perform pattern search.

Pattern search works by searching for a POI, which may be present in a source area, inside a target area. In the case of the embodiments described herein, a target area may be one of the rows described herein, and the source areas may be defined in the target area as described further herein. For example, in the case of third row 406 shown in FIG. 4, two instances 424 and 426 of a source area are shown in the third row, which may be the target area. Additional instances of the source area (not shown) may be defined within the third row so that the entirety of the third row can be examined for POI. In this same manner, source areas may also be defined in other rows shown in FIG. 4.

Pattern search finds all repetitions of the POI in the target area, using which the pitch can be calculated. In this manner, pattern search can substantially accurately identify the repeating cell and the extent of repetition. Pattern search may find the number and pitch of repetitions of POI or may not find any repeating units. The repeating pitch can be used to determine the extent of the repeating logic as described further herein.

In another embodiment, detecting the first and second polygons is performed with pattern search that includes searching for the first and second polygons in source areas in the first and second rows, respectively, the source areas have a width parallel to the edge of the known area determined based on a largest cell width for a technology node of the specimen, and the source areas have a height perpendicular to the edge of the known area that is equal to one pixel in an image of the specimen generated by an imaging subsystem. The computer system(s) may first define the source area containing the POI. If the source area is bigger than the POI, then repetitions are reliably identified; otherwise repeating patterns can be missed. For example, pattern search may be sensitive to source area definition. If the source area is not big enough to contain a single full polygon from the POI, then pattern search may look for a reference edge inside the source area to do the search. However, if both a full polygon and a reference edge are not found inside the source area, then pattern search may terminate the search. Since the POI is not known in the embodiments described herein, a source area with width equal to the largest cell width for a given technology node may be identified, and the computer system(s) may start searching. The technology node for a specimen can be identified based on the design for the specimen, and the largest cell width for the given technology node may be determined from the design or general knowledge available in the art. If the target area has polygons and pattern search terminates because the source area is too small, then the source area width may be incrementally increased, e.g., up to 0.33*target width, or until pattern search finds a POI to use for searching. Source area height may be one pixel.

The computer system(s) are also configured for determining first and second repeating pitches of the first and second polygons, respectively. For example, in the case of pattern search, source areas containing POIs are identified within the row, and repetitions in the extracted row polygons are searched for. Once pattern search finds all repetitions of the POI in the target area, the pitch can be calculated. In this manner, in the case of repeating logic 302 shown in FIG. 3, starting from the top edge of memory array 300, the computer system(s) may calculate the repeating pitch of the polygons for each row, row by row, using the results of the polygon extracting (detecting) step.

In one such embodiment, the computer system(s) may detect polygons in a current row, as shown in step 504 of FIG. 5, which may be performed as described further herein. Detecting the polygons in any of the rows as described herein may include extracting polygons from the design. All the polygons that intersect the area covered by the current row may be extracted. The computer system(s) may determine in step 506 if there are polygons detected in the current row based on results of the polygon detection step. When there are polygons detected in the current row, the computer system determines the repeating pitch of the identified polygons in step 508. In step 510, the computer system may then determine if the current row is the first row, which may be defined as described herein, e.g., the row closest to the edge of the known area. When the current row is the first row, the computer system(s) may define the next row, as shown in step 512, which may be the second row as described herein. Steps 504 and 506 and possibly steps 508 and 510 may then be performed for the next row and as described above.

When the current row is now the second row, polygons have been detected in the row in step 506, and the repeating pitch of the polygons is detected in step 508, in step 510, the computer system(s) will determine that the current row is not the first row, which means that repeating pitches for at least two rows are available for comparison. In this manner, the computer system(s) may determine if the repeating pitch of the current row matches the last row in step 514. If the repeating pitches of the two rows match, then steps 512, 504, and 506 and possibly steps 508, 510, and 514 are repeated for the next row, e.g., third row 406 shown in FIG. 4. The detecting polygons and determining repeating pitches steps may be repeated until one of the stopping conditions described further herein is found. For example, in the case of repeating logic 302 shown in FIG. 3, we traverse up the rows in the Y direction and repeat the same process for every row, until one of the stopping conditions described herein is found.

When the first and second repeating pitches are different from each other, the computer system(s) are configured for determining an outer boundary of the area having the unknown patterns and the unknown pattern repeatability as the outer boundary of the first row. In this manner, the repeating pitch can be used to determine the extent of the repeating logic in the embodiments described herein. In particular, when the calculated pitch of the current row is different from the previous row's pitch, the computer system(s) may determine that a row with a new repeating pattern is starting and hence identify that point as the boundary of the unknown area. As shown in steps 514 and 516 of FIG. 5, for example, when the repeating pitch of the current row does not match the repeating pitch of the last row, then the process may be stopped, and the computer system(s) may determine the outer boundary of the unknown area as the outer boundary of the last row.

In particular, when step 514 of FIG. 5 determines that the repeating pitches of first and second rows 402 and 404, respectively, shown in FIG. 4 are different from each other, in step 516 shown in FIG. 5, the computer system(s) will determine the outer boundary of the unknown area as outer boundary 416 of the first row. If the current row is the third row and step 514 of FIG. 5 determines that the repeating pitches of second and third rows 404 and 406, respectively, shown in FIG. 4 are different from each other, then in step 516 shown in FIG. 5, the computer system(s) will determine the outer boundary of the unknown area as outer boundary 418 of the second row.

Using the steps described herein, the computer system(s) can quickly and easily identify the outer boundary of the unknown area or repeating logic block without user input. As a result, one advantage of the embodiments described herein is that they can significantly increase the area of repeating logic blocks identified with minimum turn-around time compared to currently used methods and systems.

Determining the outer boundary of the area may also include, when the first and second repeating pitches are different from each other, checking if the second pitch is an integer multiple of the first pitch (or vice versa). For example, taking the case of known area 400, first row 402 may have first polygons (not shown) having a repeating pitch of N, second row 404 may have second polygons (not shown) having a repeating pitch of N*2, third row 406 may have third polygons (not shown) having a repeating pitch of N, and a fourth row may (not shown) have fourth polygons having a repeating pitch of N*1.33. Since the repeating pitches in the first, second, and third rows are integer multiples of each other, they can be identified as the same repeating unit for array mode purposes. In this manner, the first, second, and third rows may be eligible for array mode inspection in which the repeating pitch used for inspection is N*2 (i.e., the biggest repeating pitch that is an integer multiple of all of the smaller pitches). As such, the outer boundary of the unknown area may be defined as outer boundary 420 of the third row.

The outer boundary may be identified in this manner, regardless of what the polygons are in each of the rows. For example, even if the polygons in the first, second, and third rows are different from each other, by identifying the repeating pitch for array mode inspection as N*2 in the above example and performing array mode inspection in the direction parallel to the repeating pitch, e.g., possibly with test and reference images that have a width corresponding to the N*2 repeating pitch and as high as the three rows, the images that are compared to each other in the array mode inspection will include the same polygons at the same within image locations.

In one embodiment, when the inner boundary of the first row is the edge of the known area, the computer systems are configured for determining an inner boundary of the area having the unknown patterns and the unknown pattern repeatability as the inner boundary of the first row. For example, as shown in step 518 of FIG. 5, the computer system(s) may determine an inner boundary of the unknown area as the inner boundary of the first row. As shown in FIG. 4, for example, the inner boundary of the unknown area may be determined as inner boundary 414 of first row 402, which also happens to be the edge of known area 400. The inner boundary of the unknown area may be defined in this manner, when the first row is defined so as to extend from the edge of the known area and when the first row contains polygons.

If the inner boundary of the first row is spaced from the edge of the known area (not shown) and first polygons are detected in the first row, however, then the inner boundary of the unknown area may be determined as the inner boundary of the first row and not the edge of the known area. In addition, if the first row is determined, as described herein, to include some blank space between the edge of the known area and the first polygons, then the inner boundary of the unknown area may be determined as a line through an edge of the first polygons closest to the edge of the known area. In this manner, the unknown area may be defined to exclude any blank space between the edge of the known area and the first polygons.

In another embodiment, when the inner boundary of the first row is the edge of the known area and when none of the first polygons are detected in the first row, the computer system(s) are configured for increasing the first dimension of the first row. The computer system(s) are also configured for repeating the detecting the first polygons and increasing the first dimension of the first row steps until the first polygons are detected in the first row or the first dimension of the first row is equal to or larger than a predetermined upper limit for the first dimension of the first row. When the first dimension of the first row is equal to or larger than the predetermined upper limit and none of the first polygons are detected in the first row, the computer system(s) are configured for determining that the area having the unknown patterns and the unknown pattern repeatability is unpatterned. For example, if during pattern search, a target area is blank and does not have any polygons, then the computer system(s) may skip that area. If the pattern search terminates because the row height is too small, then the row height may be incrementally increased, e.g., up to 2*row height, or until pattern search finds a POI to use for searching.

As shown in FIG. 5, for example, when the computer system(s) determine in step 506 that there are no polygons in a row, the computer system(s) may determine if the first dimension of the row (e.g., dimension 408 of first row 402 shown in FIG. 4) is equal to or larger than a predetermined upper limit, as shown in step 520 in FIG. 5. When the computer system(s) determine that the first dimension of the row is not equal to or larger than the predetermined upper limit, in step 522, the computer system(s) increase the first dimension of the row and then repeat at least steps 504 and 506 for the row with the larger dimension. If in step 506 the computer system(s) determine that there are polygons in the row with the increased dimension, then the computer system(s) may proceed to step 508 for the row. If in step 506, the computer system(s) determine that no polygons are detected in the row with the increased dimension, then the computer system(s) may repeat at least step 520 for that row. If in step 520 the computer system(s) determine that the first dimension of the row is equal to or larger than the predetermined upper limit, the computer system(s) may determine in step 524 if the current row is the first row. If the computer system(s) determine that the current row is the first row, then in step 526, the computer system(s) may determine that the unknown area is unpatterned and the process may terminate.

In an additional embodiment, when none of the second polygons are detected in the second row, the one or more computer systems are configured for increasing the first dimension of the second row and repeating the detecting the second polygons and increasing the first dimension of the second row steps until the second polygons are detected in the second row or the first dimension of the second row is equal to or larger than a predetermined upper limit for the first dimension of the second row. When the first dimension of the second row is equal to or larger than the predetermined upper limit and none of the second polygons have been detected in the second row, the computer system(s) are configured for determining the outer boundary of the area having the unknown patterns and the unknown pattern repeatability as the outer boundary of the first row. For example, if the computer system(s) find an area with no polygons, then the computer system(s) can use heuristics to determine if further steps should be performed. In particular, relatively small blank areas within repeating logic can be skipped. Otherwise, if the height of the blank area exceeds a user configurable value, then the computer system(s) may stop the search and mark the boundary of the repeating logic as described herein.

As shown in FIG. 5, for example, when the computer system(s) determine in step 506 that there are no polygons in a second row, the computer system(s) may determine if the first dimension of the second row (e.g., dimension 410 of second row 404 shown in FIG. 4) is equal to or larger than a predetermined upper limit, as shown in step 520 in FIG. 5. When the computer system(s) determine that the first dimension of the second row is not equal to or larger than the predetermined upper limit, in step 522, the computer system(s) increase the first dimension of the row and then repeat at least steps 504 and 506 for the second row with the larger dimension. If in step 506 the computer system(s) determine that there are polygons in the second row with the increased first dimension, then the computer system(s) may proceed to step 508 for the second row. If in step 506, the computer system(s) determine that no polygons are detected in the row with the increased first dimension, then the computer system(s) may repeat at least step 520 for that row. If in step 520 the computer system(s) determine that the first dimension of the row is equal to or larger than the predetermined upper limit, the computer system(s) may determine in step 524 if the current row is the first row. If the computer system(s) determine that the current (second) row is not the first row, then in step 528, the computer system(s) may stop the process and determine the outer boundary of the unknown area as the outer boundary of the last row, i.e., in the case of the second row, the outer boundary of the unknown area would be the outer boundary of the first row.

In a further embodiment, when the first and second repeating pitches are not different from each other, the computer system(s) are configured for detecting third polygons in a third row in the design for the specimen, which may be performed as described herein. The third row has a first dimension extending in the first direction from the outer boundary of the second row to an outer boundary of the third row. For example, as shown in FIG. 4, third row 406 has first dimension 412 in a first direction perpendicular to edge 414 of known area 400 from outer boundary 418 of second row 404 to outer boundary 420 of the third row. In this manner, the inner boundary of the third row and the outer boundary of the second row are the same. Like the first and second rows, third row 406 has second dimension 422 extending in a second direction parallel to edge 414 of known area 400 equal to a length of the edge of the known area. The computer system(s) are also configured for determining a third repeating pitch of the third polygons, which may be performed as described herein and, when the second and third repeating pitches are different from each other, determining the outer boundary of the area having the unknown patterns and the unknown pattern repeatability as the outer boundary of the second row. These steps may be performed as shown in FIG. 5 and as described further herein with respect to the second row. In other words, each successive row may be examined in the same manner as described with respect to the second row until one of the stopping conditions described herein is found.

In another embodiment, the detecting the first and second polygons, determining the first and second repeating pitches, and determining the outer boundary of the area steps described herein are performed without user input. In particular, one important advantage of the embodiments described herein is that they can automatically identify the extent of repeating geometry without user input. For example, one important new feature of the embodiments described herein is that they can identify the extent of repeating geometry without user-specified bounding boxes. In addition, the embodiments described herein are configured for performing the steps described herein without a user explicitly specifying the repeating pattern or the boundary of repetition. In particular, the design that is available to inspection tool users may include outlines for memory areas, but not for the presence of repeating patterns in logic regions. In currently used methods, manual or semi-manual approaches may be used but do not scale well for complex designs. The embodiments described herein, however, provide an automatic technique that can draw outlines for repeating geometry in logic regions without manual intervention and with only a design file that contains the limited information usually available to inspection tool users.

In some embodiments, the computer system(s) are configured for generating information indicating the area having the unknown patterns and the unknown pattern repeatability is eligible for array mode inspection, as shown in step 530 of FIG. 5. For example, in (optical and other) inspection tools, repeating geometry can be inspected using a special mode called "array mode." Array mode inspection reduces noise, uncovers defects missed by other modes and hence improves sensitivity. Today, array mode is mostly used to inspect memory arrays (SRAM, DRAM, etc.) and small pockets of logic regions about which users have prior knowledge. The embodiments described herein can be incorporated into software tools and flows used to identify areas for array mode inspection. In this manner, the embodiments described herein can advantageously increase the amount of area inspected in array mode and thereby lead to better sensitivity for (optical and other) inspection tools.

Array mode inspection generally includes comparing images of different instances of the same repeating structure (often called a "cell" in the case of a memory array area) formed within a single patterned area, e.g., a memory array area in a single die, on a specimen to each other. The different instances of the same repeating structure that are compared to each other are usually formed adjacent to each other on the specimen. One or more difference images may thereby be generated for each of the instances of the repeating structure. In perhaps the most simple implementation, then, a threshold may be applied to the difference image(s). Any portions of the difference images having a signal above the threshold may be identified as a detected defect (a defect candidate or potential defect), and all other portions of the difference images may be ignored.

Any portions of the unknown areas that are found by the embodiments described herein to have polygons with repeating pitches may be automatically identified as eligible for array mode inspection. However, the computer system(s) may also be configured for performing additional analysis of the unknown areas found to have repeating polygons. For example, the computer system(s) may determine if there are enough of the repeating polygons for array mode inspection. In another example, the computer system(s) may use the repeating pitch of the discovered polygons to determine if the polygons are close enough together to make array mode inspection feasible. In general, however, such steps may be unnecessary and any portions of previously unknown areas found to have polygons with repeating pitches may be identified as array mode inspection eligible areas.

The information that is generated by the computer system(s) to indicate a previously unknown area that is eligible for array mode inspection may include any suitable information that has any suitable form or format. For example, the information may have the same form or format as a care area, which generally includes information for a location of the care area, e.g., on the specimen or in an image of the specimen, in addition to information for the type of care area it is and/or how the area is to be inspected.

In a further embodiment, the computer system(s) are configured for setting up one or more care areas for an inspection process performed on the specimen based on the determined outer boundary of the area having the unknown patterns and the unknown pattern repeatability, as shown in step 534 of FIG. 5. For example, as described above, when any of the unknown areas are found to have multiple instances of the same polygons with repeating pitches, the computer system(s) may designate those areas as array mode inspection care areas and they may be assigned a care area (CA) or care area group (CAG) ID along with any other information suitable for use in inspection of the CAs or CAGs.

One or more of the previously unknown areas that have the same characteristics (e.g., location within the design for the specimen, the same types of polygons formed therein, the same repeating pitch of the polygons, etc.) may be assigned to the same CAG and with the same CA information. Any of the previously unknown areas that have one or more different characteristics such as those described above may be assigned to different CAGs with at least some different CA information. For example, the embodiments described herein may identify one or more first repeating logic areas in a design for a specimen in addition to one or more second repeating logic areas in the design, and the first and second repeating logic areas may have at least one characteristic that is different enough that they should be inspected with one or more different parameters. In that case, they may be assigned to different CAGs that can be inspected with different parameters.

If it is possible that a specimen design may have such different repeating logic areas, the computer system(s) may evaluate each (or at least some) of the different unknown areas in the design to determine their characteristics as described herein. The different unknown areas may then be grouped based on their characteristics into different CAGs, and the areas in each of the CAGs may be inspected with different parameters. The output of this step may include the CAG designations and any other information generated for the care areas such as design location, specimen location, size, etc.

In one embodiment, the system includes the imaging subsystem. For example, the one or more computer systems described herein may be coupled to or included in an imaging system. In this manner, the embodiments described herein may be configured for on-tool care area setup, even if the embodiments described herein do not need any of the images generated by the imaging subsystem for care area setup. If the system includes the imaging subsystem, then the same computer system(s) that generated the care areas may also be configured to apply the care areas to images generated by the imaging subsystem during the process. If the system does not include the imaging subsystem, then another system or method may be configured for using and applying the resulting care areas in a process performed on the specimen.

The embodiments described herein are particularly suitable for setting up care areas for an optical inspection of a wafer on which semiconductor devices are being formed. The care areas may be any of the care areas described further herein including care areas where inspection is to be performed versus where inspection is not to be performed. The care areas may also differentiate areas that are to be inspected with one or more different parameters compared to other areas on the specimen. In addition, the embodiments described herein may be configured to set up care areas for any inspection process such as a wafer inspection process, a reticle inspection process, another type of specimen inspection process, an optical or light-based inspection process, an electron beam inspection process, etc. Furthermore, although the embodiments described herein are particularly suitable for setting up care areas for an inspection process, the embodiments may also be configured for setting up care areas for other semiconductor-based processes such as metrology processes.

In another embodiment, the computer system(s) are configured for selecting one or more parameters for an inspection process performed on the specimen based on the determined outer boundary of the area having the unknown patterns and the unknown pattern repeatability, as shown in step 532 of FIG. 5. The parameter(s) that are selected may include parameter(s) for inspection of any of the previously unknown areas identified as eligible for array mode inspection. For example, the computer system(s) may be configured for selecting a parameter of an inspection recipe for the specimen based on one or more of the CAGs such that different CAGs are inspected with different values of the parameter when the inspection recipe is performed for the specimen. The different values of the parameter of the inspection recipe may include different sensitivities of a defect detection method used in the inspection recipe to detect defects on the specimen. Such a sensitivity may be controlled by, for example, one or more thresholds used to separate a specimen image into pixels that correspond to defects and pixels that do not correspond to defects.

The inspection parameters for each of the CAGs (in the instances in which there are two or more CAGs for a single inspection of a single specimen) may be independently and separated selected, which may result in different inspection parameters for any of two or more CAGs. Each of the inspection recipe parameters selected separately and independently for the different CAGs may be combined into a single inspection recipe that is performed for the specimen. In addition, selecting the inspection recipe parameters may be performed for multiple CAGs at the same time to thereby optimize the inspection recipe parameter for multiple CAGs.

The computer system(s) described herein may also be configured for selecting any other parameters of the inspection process. For example, the computer system(s) may be configured for complete inspection recipe setup including, but not limited to, the imaging hardware parameters, the defect detection method parameters, other image processing parameters, etc. for the areas identified as array mode eligible as described herein in addition to any other areas on the specimen, e.g., the memory array areas.

The one or more computer systems may also or alternatively be configured for selecting a parameter of a metrology recipe for the specimen based on the CAGs such that the different CAGs are measured with different values of the parameter of the metrology recipe. For example, the embodiments described herein are not limited to setting up care areas for just inspection. Instead or additionally, the embodiments may be used for other processes like metrology. In such embodiments, the steps may be performed as described herein, and the parameter of the metrology recipe that is selected may include any suitable parameter of the metrology recipe including hardware and software parameters. In this manner, the parameter(s) of the metrology recipe can be varied from CAG to CAG for the CAGs designated by the embodiments described herein.

The computer system(s) may be configured for storing information for the CAGs for use in a process such as inspection of the specimen. The computer system(s) may be configured to store the information in a recipe or by generating a recipe for the process in which the CAGs will be used. A "recipe" as that term is used herein can be generally defined as a set of instructions that can be used by a tool to perform a process on a specimen. In this manner, generating a recipe may include generating information for how a process is to be performed, which can then be used to generate the instructions for performing that process. The information for the CAGs that is stored by the computer system(s) may include any information that can be used to identify and/or use the CAGs (e.g., such as a file name and where it is stored, and the file may include information for the CAGs such as CAG id, CAG locations, etc.).

The computer system(s) may be configured for storing the information for the CAGs in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate an inspection recipe as described above. That inspection recipe may then be stored and used by the system or method (or another system or method) to inspect the specimen or other specimens to thereby generate information (e.g., defect information) for the specimen or other specimens.

The computer system(s) and/or the imaging subsystem may be configured to use the results of one or more steps described herein to perform the inspection process on the specimen and/or other specimens of the same type. Such an inspection process may produce results for any defects detected on the specimen(s) such as location, etc., of the bounding boxes of the detected defects, detection scores, information about defect classifications such as class labels or IDs, etc., or any such suitable information known in the art. The results for the defects may be generated by the computer system(s) and/or imaging subsystem in any suitable manner. The results for the defects may have any suitable form or format such as a standard file type. The computer system(s) may generate the results and store the results such that the results can be used by the computer system(s) and/or another system or method to perform one or more functions for the specimen(s) or another specimen of the same type. For example, that information may be used by the computer system(s) or another system or method for sampling the defects for defect review or other analysis, determining a root cause of the defects, etc.

Functions that can be performed using such information also include, but are not limited to, altering a process such as a fabrication process or step that was or will be performed on the inspected specimen or another specimen in a feedback or feedforward manner. For example, the computer system(s) may be configured to determine one or more changes to a process that was performed on a specimen inspected as described herein and/or a process that will be performed on the specimen based on the detected defect(s). The changes to the process may include any suitable changes to one or more parameters of the process. The computer system(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer system(s) may determine such changes in any suitable manner known in the art.

Those changes can then be sent to a semiconductor fabrication system (not shown) or a storage medium (not shown) accessible to the computer system(s) and the semiconductor fabrication system. The semiconductor fabrication system may or may not be part of the system embodiments described herein. For example, the computer system(s) and/or imaging system described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments can be used to setup a new process or recipe. The embodiments may also be used to modify an existing process or recipe, whether that is a process or recipe that was used for the specimen or was created for one specimen and is being adapted for another specimen.

Each of the embodiments of each of the systems described above may be combined together into one single embodiment.

Another embodiment relates to a computer-implemented method for determining information for an area having unknown patterns and unknown pattern repeatability. The method includes the detecting first and second polygons, determining first and second repeating pitches, and determining the outer boundary steps described above. Each of the steps of the method may be performed as described further herein. The method may also include any other step(s) that can be performed by the imaging subsystem and/or computer system(s) described herein. The detecting first and second polygons, determining first and second repeating pitches, and determining the outer boundary steps are performed by one or more computer systems, which may be configured according to any of the embodiments described herein. In addition, the method described above may be performed by any of the system embodiments described herein.

Figure 6:
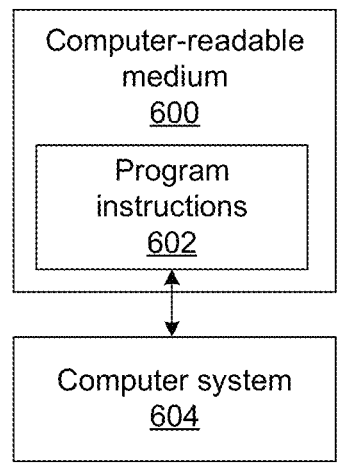
FIG. 6 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for an area having unknown patterns and unknown pattern repeatability. One such embodiment is shown in FIG. 6. In particular, as shown in FIG. 6, non-transitory computer-readable medium 600 includes program instructions 602 executable on computer system 604. The computer-implemented method may include any step(s) of any method(s) described herein.

Program instructions 602 implementing methods such as those described herein may be stored on computer-readable medium 600. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 604 may be configured according to any of the embodiments described herein.

Further modifications and alternative embodiments of various aspects of the invention will be apparent to those skilled in the art in view of this description. For example, methods and systems for determining information for an area having unknown patterns and unknown pattern repeatability are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for determining information for an area having unknown patterns and unknown pattern repeatability, comprising:
one or more computer systems configured for:
detecting first and second polygons in first and second rows, respectively, in a design for a specimen, wherein the first row has a first dimension extending in a first direction perpendicular to an edge of a known area in the design from an inner boundary to an outer boundary of the first row, and wherein the second row has a first dimension extending in the first direction from the outer boundary of the first row to an outer boundary of the second row;
determining first and second repeating pitches of the first and second polygons, respectively; and
when the first and second repeating pitches are different from each other, determining an outer boundary of the area having the unknown patterns and the unknown pattern repeatability as the outer boundary of the first row.

2. The system of claim 1, wherein the known area comprises a memory array area formed on the specimen.

3. The system of claim 1, wherein the first and second polygons comprise repeating logic structures.

4. The system of claim 1, wherein the first and second rows have a second dimension extending in a second direction parallel to the edge of the known area equal to a length of the edge of the known area.

5. The system of claim 1, wherein the detecting, determining the first and second repeating pitches, and determining the outer boundary of the area steps are separately performed for an additional edge of the known area.

6. The system of claim 1, wherein detecting the first and second polygons is performed with pattern search that comprises searching for unknown patterns of interest.

7. The system of claim 1, wherein detecting the first and second polygons is performed with pattern search that comprises searching for the first and second polygons in source areas in the first and second rows, respectively, wherein the source areas have a width parallel to the edge of the known area determined based on a largest cell width for a technology node of the specimen, and wherein the source areas have a height perpendicular to the edge of the known area that is equal to one pixel in an image of the specimen generated by an imaging subsystem.

8. The system of claim 1, wherein when the inner boundary of the first row is the edge of the known area, determining an inner boundary of the area having the unknown patterns and the unknown pattern repeatability as the inner boundary of the first row.

9. The system of claim 1, wherein the one or more computer systems are further configured for:
when the inner boundary of the first row is the edge of the known area and when none of the first polygons are detected in the first row, increasing the first dimension of the first row;
repeating the detecting the first polygons and increasing the first dimension of the first row steps until the first polygons are detected in the first row or the first dimension of the first row is equal to or larger than a predetermined upper limit for the first dimension of the first row; and
when the first dimension of the first row is equal to or larger than the predetermined upper limit and none of the first polygons are detected in the first row, determining that the area having the unknown patterns and the unknown pattern repeatability is unpatterned.

10. The system of claim 1, wherein the one or more computer systems are further configured for:
when none of the second polygons are detected in the second row, increasing the first dimension of the second row;
repeating the detecting the second polygons and increasing the first dimension of the second row steps until the second polygons are detected in the second row or the first dimension of the second row is equal to or larger than a predetermined upper limit for the first dimension of the second row; and
when the first dimension of the second row is equal to or larger than the predetermined upper limit and none of the second polygons have been detected in the second row, determining the outer boundary of the area having the unknown patterns and the unknown pattern repeatability as the outer boundary of the first row.

11. The system of claim 1, wherein the one or more computer systems are further configured for:
when the first and second repeating pitches are not different from each other, detecting third polygons in a third row in the design for the specimen, wherein the third row has a first dimension extending in the first direction from the outer boundary of the second row to an outer boundary of the third row;
determining a third repeating pitch of the third polygons; and
when the second and third repeating pitches are different from each other, determining the outer boundary of the area having the unknown patterns and the unknown pattern repeatability as the outer boundary of the second row.

12. The system of claim 1, wherein the one or more computer systems are further configured for determining the edge of the known area in the design based on an array outline layer in the design for the specimen.

13. The system of claim 1, further comprising an imaging subsystem configured for generating an image of the specimen, wherein the first dimension of the first and second rows is equal to one pixel in the image, and wherein the one or more computer systems are further configured for selecting a pixel size for said generating equal to a smallest pixel size of the imaging subsystem.

14. The system of claim 1, wherein said detecting, determining the first and second repeating pitches, and determining the outer boundary of the area are performed without user input.

15. The system of claim 1, wherein said detecting, determining the first and second repeating pitches, and determining the outer boundary of the area are performed without hierarchical blocks in the design for the specimen.

16. The system of claim 1, wherein the one or more computer systems are further configured for generating information indicating the area having the unknown patterns and the unknown pattern repeatability is eligible for array mode inspection.

17. The system of claim 1, wherein the one or more computer systems are further configured for selecting one or more parameters for an inspection process performed on the specimen based on the determined outer boundary of the area having the unknown patterns and the unknown pattern repeatability.

18. The system of claim 1, wherein the one or more computer systems are further configured for setting up one or more care areas for an inspection process performed on the specimen based on the determined outer boundary of the area having the unknown patterns and the unknown pattern repeatability.

19. The system of claim 1, wherein the design for the specimen is an image of the specimen generated by an imaging subsystem.

20. The system of claim 1, wherein the design for the specimen is a design image of the specimen generated from design data for the specimen.

21. The system of claim 1, wherein the design for the specimen comprises a vectorized representation of design shapes in design data for the specimen.

22. A non-transitory computer-readable medium, storing program instructions executable on a computer system for performing a computer-implemented method for determining information for an area having unknown patterns and unknown pattern repeatability, wherein the computer-implemented method comprises:
detecting first and second polygons in first and second rows, respectively, in a design for a specimen, wherein the first row has a first dimension extending in a first direction perpendicular to an edge of a known area in the design from an inner boundary to an outer boundary of the first row, and wherein the second row has a first dimension extending in the first direction from the outer boundary of the first row to an outer boundary of the second row;

determining first and second repeating pitches of the first and second polygons, respectively; and when the first and second repeating pitches are different from each other, determining an outer boundary of the area having the unknown patterns and the unknown pattern repeatability as the outer boundary of the first row.

23. A computer-implemented method for determining information for an area having unknown patterns and unknown pattern repeatability, comprising:

detecting first and second polygons in first and second rows, respectively, in a design for a specimen, wherein the first row has a first dimension extending in a first direction perpendicular to an edge of a known area in the design from an inner boundary to an outer boundary of the first row, and wherein the second row has a first dimension extending in the first direction from the outer boundary of the first row to an outer boundary of the second row;

determining first and second repeating pitches of the first and second polygons, respectively; and when the first and second repeating pitches are different from each other, determining an outer boundary of the area having the unknown patterns and the unknown pattern repeatability as the outer boundary of the first row, wherein the detecting, determining the first and second repeating pitches, and determining the outer boundary steps are performed by one or more computer systems.

* * * * *